(12) United States Patent
Neyens

(10) Patent No.: US 10,915,069 B2
(45) Date of Patent: Feb. 9, 2021

(54) MONITORING SYSTEM FOR MONITORING USAGE OF UNIQUELY IDENTIFIABLE MACHINE COMPONENTS

(71) Applicant: Caterpillar Inc., Deerfield, IL (US)

(72) Inventor: Vincent Neyens, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 257 days.

(21) Appl. No.: 16/046,313

(22) Filed: Jul. 26, 2018

(65) Prior Publication Data
US 2020/0033812 A1    Jan. 30, 2020

(51) Int. Cl.
*G04F 10/00* (2006.01)
*G06Q 30/06* (2012.01)
(Continued)

(52) U.S. Cl.
CPC ........... *G04F 10/00* (2013.01); *G06Q 10/087* (2013.01); *G06Q 10/20* (2013.01);
(Continued)

(58) Field of Classification Search
CPC ...... G04F 10/00; G06Q 10/087; G06Q 10/20; G06Q 30/0633; G06N 20/00; G06B 5/04
(Continued)

(56) References Cited

U.S. PATENT DOCUMENTS 7,400,268 B2 * 7/2008 Wilbrink ............... G07C 5/085
340/438
8,311,698 B2 * 11/2012 Boss ..................... G06Q 10/20
701/29.6
(Continued)

FOREIGN PATENT DOCUMENTS

CN    106960298    7/2017
WO    2002086787   10/2002

OTHER PUBLICATIONS

Gopalakrishna Palem "Condition-Based Maintenance Using Sensor Arrays and Telematics," International Journal of Mobile Network Communications & Telematics, Jun. 2013, vol. 3 No. 3, Symphony-Teleca Corporation, Bangalore, India.
(Continued)

*Primary Examiner* — Peter D Nolan
*Assistant Examiner* — Wae L Louie
(74) *Attorney, Agent, or Firm* — Harrity & Harrity LLP

(57) ABSTRACT

System and methods for monitoring machine components are disclosed. A method may include detecting, by an electronic chip having a globally unique identifier and being integrated within the component of the machine, installation of the component in the machine. The method may include determining, by a monitoring module operatively connected to the electronic chip via a communication bus, a date or time of the installation based on receiving information regarding the installation from the electronic chip. The method may include monitoring, by the monitoring module, the component to determine an amount of time that the component has been operating. The method may include transmitting, by a transmitter module operatively connected to the monitoring module, information that identities the globally unique identifier, the date or time of the installation of the component in the machine, and the amount of time that the component has been operating.

20 Claims, 6 Drawing Sheets

(51) Int. Cl.
  *G06Q 10/08* (2012.01)
  *G06Q 10/00* (2012.01)
  *G06N 5/04* (2006.01)
  *G06N 20/00* (2019.01)
(52) U.S. Cl.
  CPC .......... *G06Q 30/0633* (2013.01); *G06N 5/04* (2013.01); *G06N 20/00* (2019.01)
(58) Field of Classification Search
  USPC ........................................ 701/29.1
  See application file for complete search history.

(56) References Cited

U.S. PATENT DOCUMENTS

| | | | | |
|---|---|---|---|---|
| 2004/0073468 | A1* | 4/2004 | Vyas | G06Q 10/0639 705/7.13 |
| 2005/0035852 | A1 | 2/2005 | Paulsen | |
| 2005/0143883 | A1* | 6/2005 | Yamagiwa | G06Q 10/06 701/29.6 |
| 2006/0053075 | A1* | 3/2006 | Roth | G06Q 10/06 705/50 |
| 2007/0005197 | A1 | 1/2007 | Ito et al. | |
| 2007/0072547 | A1 | 3/2007 | Sims, III et al. | |
| 2007/0114280 | A1 | 5/2007 | Coop et al. | |
| 2010/0205044 | A1* | 8/2010 | Scheer | G06Q 10/087 705/28 |
| 2013/0131952 | A1* | 5/2013 | Komine | G06F 17/00 701/101 |
| 2018/0174114 | A1* | 6/2018 | Neyens | G06Q 10/20 |
| 2020/0033812 | A1* | 1/2020 | Neyens | G06Q 10/087 |

OTHER PUBLICATIONS

Gary Wollenhaupt, "Three Ways Fleet Maintenance Is Using Sensor Technology," Insights, Mar. 21, 2017, 3 pages, Samsung.com, https://insights.samsung.com/2017/03/21/three-ways-fleet-maintenance-is-using-sensor-technology/.

Hope Bruce, "What is Usage Based Preventive Maintenance and Why Is It Important for Field Services?," Hitachi Solutions, 2 pages.

Bernd Hellingrath and Ann-Kristin Cordes, "Conceptual approach for integrating condition monitoring information and spare parts forecasting methods," Taylor & Francis Online, Sep. 15, 2014, 22 pages.

* cited by examiner

MONITORING SYSTEM FOR MONITORING USAGE OF UNIQUELY IDENTIFIABLE MACHINE COMPONENTS

TECHNICAL FIELD

The present disclosure relates generally to monitoring systems and methods and, more particularly, to monitoring system and methods for monitoring the usage of uniquely identifiable machine components.

BACKGROUND

Proper maintenance of machines can help ensure more reliable, safer, and longer performance. A machine manufacturer often provides a recommended maintenance schedule for their machine, but implementing and following the recommended maintenance schedule can be a challenge. Some systems for helping track vehicle maintenance have been developed. One system for tracking vehicle maintenance using sensor detection is described in U.S. Pat. No. 8,311,698 (the '698 patent) assigned to International Business Machines (IBM), which issued on Nov. 13, 2012. The '698 patent describes using radio frequency identification in cooperation with a computer system aboard a motor vehicle to track service and maintenance activities relating to the vehicle. Although the system of the '698 patent may provide a way of tracking some components of a vehicle, it may be less than optimal, for example, due to the limitations and requirements associated with radio frequency identification devices.

The disclosed system is directed to overcoming one or more of the problems set forth above and/or other problems of the prior art.

SUMMARY

According to some implementations, the present disclosure is related to a system for monitoring usage of a component of a machine. The system may include an electronic chip having a unique identifier. The electronic chip may be integrated within the component of the machine and may be configured to detect installation of the component in the machine. The system may include a monitoring module configured to monitor the component to determine an amount of time that the component has been operating. The system may include a control module operatively connected to the electronic chip and the monitoring module via a communication bus. The control module may be configured to receive, from the electronic chip, the unique identifier of the electronic chip based on the detection of the installation of the component in the machine, and receive, from the monitoring module, information that indicates the amount of time that the component has been operating. The system may include a transmitter module operatively connected to the control module. The transmitter module may be configured to transmit information that identifies the unique identifier and the amount of time that the component has been operating.

According to some implementations, the present disclosure is related to a method of monitoring usage of a component of a machine. The method may include detecting, by an electronic chip having a globally unique identifier and being integrated within the component of the machine, installation of the component in the machine. The method may include determining, by a monitoring module operatively connected to the electronic chip via a communication bus, a date or time of the installation based on receiving information regarding the installation from the electronic chip. The method may include monitoring, by the monitoring module, the component to determine an amount of time that the component has been operating. The method may include transmitting, by a transmitter module operatively connected to the monitoring module, information that identifies the globally unique identifier, the date or time of the installation of the component in the machine, and the amount of time that the component has been operating.

According to some implementations, the present disclosure is related to a method of monitoring usage of one or more machine components performed by a system. The method may include receiving, via a communication link with machine, a component identifier that identities a component of the machine and a machine identifier that identities the machine. The method may include receiving, via the communication link with the machine, information that identifies an amount of time that the component has been operating. The method may include receiving, via the communication link with the machine, information that indicates one or more active time periods during which the component was in use or one or more inactive time periods during which the component was not in use. The method may include determining a user identifier associated with the machine identifier. The user identifier may identify a user associated with the machine. The method may include obtaining, based on the user identifier and information received from a user database associated with the user identifier, a maintenance schedule that indicates at least one of: a schedule of one or more maintenance staff qualified to service the machine, a coordination rule indicating two or more components that are to be replaced together, or a time period during which the machine is scheduled for maintenance. The method may include generating a maintenance rule associated with replacement of the component based on the component identifier, the maintenance schedule, and at least one of the one or more active time periods or the one or more inactive time periods. The maintenance rule may indicate one or more conditions for replacement of the component. The method may include determining that the component is to be replaced based on the maintenance rule and the information that identifies the amount of time that the component has been operating. The determination that the component is to be replaced may be triggered based on receiving, via the communication link with the machine, the information that identifies the amount of time that the component has been operating. The method may include determining, based on the user identifier and an inventory database that stores inventory information associated with the user, that a replacement component for the component is not in an inventory of the user. The method may include determining, based on a location associated with the machine and at least one of the maintenance schedule, the one or more active time periods, or the one or more inactive time periods, a date on which the replacement component is to be delivered to the location. The method may include ordering the replacement component based on determining that the replacement component is not in an inventory of the user. Ordering the replacement component may include scheduling the replacement component to be delivered to the location on the date. The method may include transmitting, to a device associated with the user identifier, a notification that the replacement component has been ordered, wherein the notification indicates the date on which the replacement component is to be delivered to the location.

Other features and aspects of this disclosure will be apparent from the following description and the accompanying drawings.

DETAILED DESCRIPTION

Figure 1:
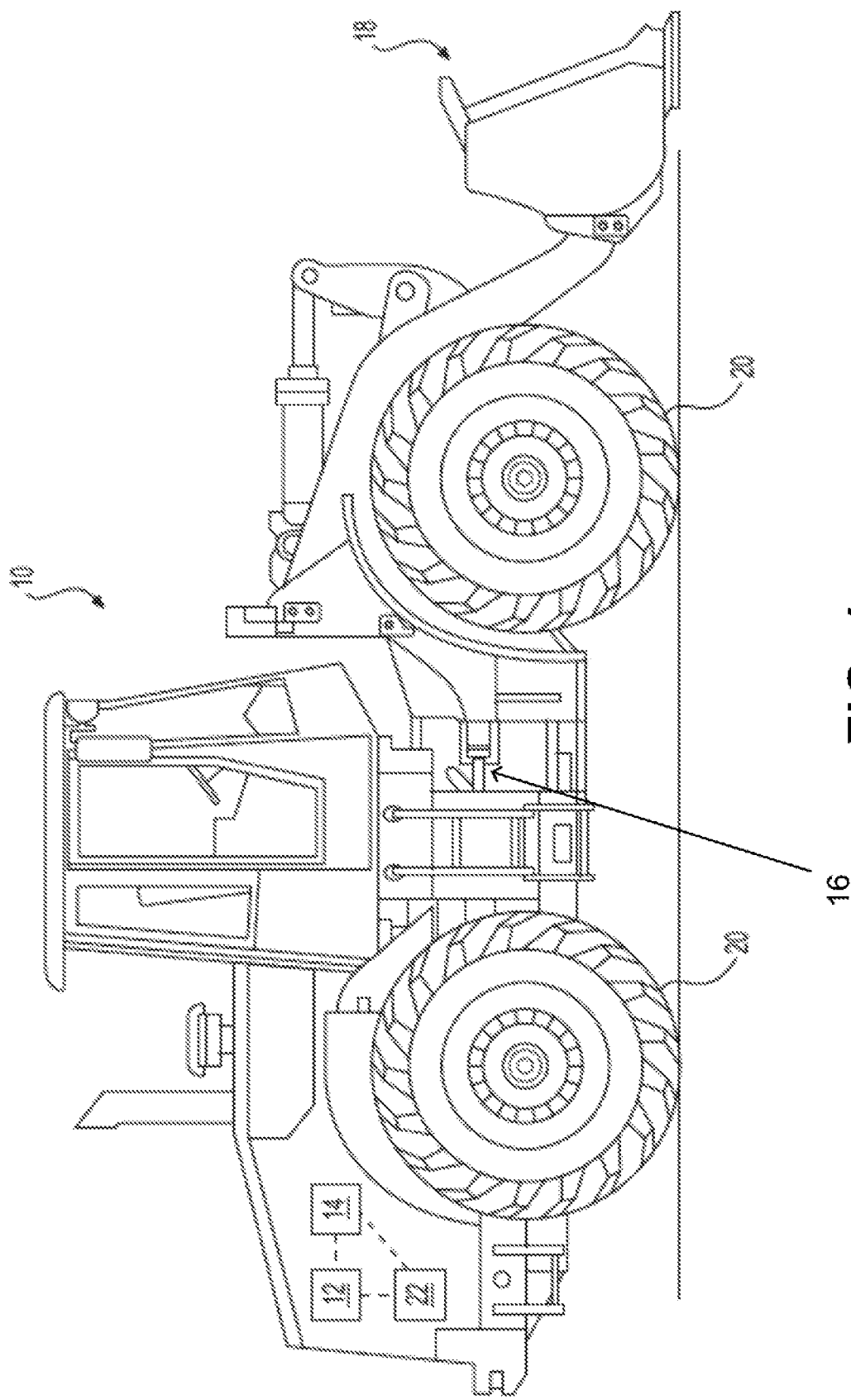
FIG. 1 is a diagram of an example machine.

FIG. 1 is a diagram of an example machine 10. Machine 10 may be, for example, a machine that performs some type of operation associated with an industry such as mining, construction, farming, transportation, or any other industry known in the art. Machine 10 may be an earth moving machine such as a loader, as illustrated in FIG. 1. Although machine 10 is embodied as a loader in the illustrated implementation of FIG. 1, aspects of the present disclosure are equally applicable to other types of non-mobile machines (e.g., generators, pumps, and/or the like) or mobile machines such as, for example, trucks, shovels, diggers, buckets, hydraulic excavators, motor graders, and/or the like. Therefore, notwithstanding any particular configuration of machine disclosed in this document, it may be noted that implementations disclosed herein can be similarly applied to other types of machines and their components without deviating from the spirit of the present disclosure.

Machine 10 may include, among other things, a drive system 12, a transmission system 14, an articulation system 16, a work implement 18 (e.g., a bucket, a shovel, and/or the like), and multiple ground engaging members. The ground engaging members may be in the form of tracks for a track-type machine or a set of wheels 20, as shown in FIG. 1. Drive system 12 may include an engine. Transmission system 14 may include gears, differential systems, axles, and/or other components that are coupled to drive stem 12 and wheels 20 of machine 10. Transmission system 14 may be configured to transfer power from drive system 12 to wheels 20 in order to drive machine 10. Articulation system 16 may be operatively coupled to work implement 18. Articulation system 16 may include hydraulically actuated linkages that enable articulation of work implement 18 during operation. Work implement 18 may operatively perform functions such as, but not limited to, hauling and dumping materials. In some implementations, machine 10 may include a monitoring system 22, as described in more detail below.

As indicated above, FIG. 1 is provided as an example. Other examples are possible and may differ from what was described in connection with FIG. 1.

Figure 2:
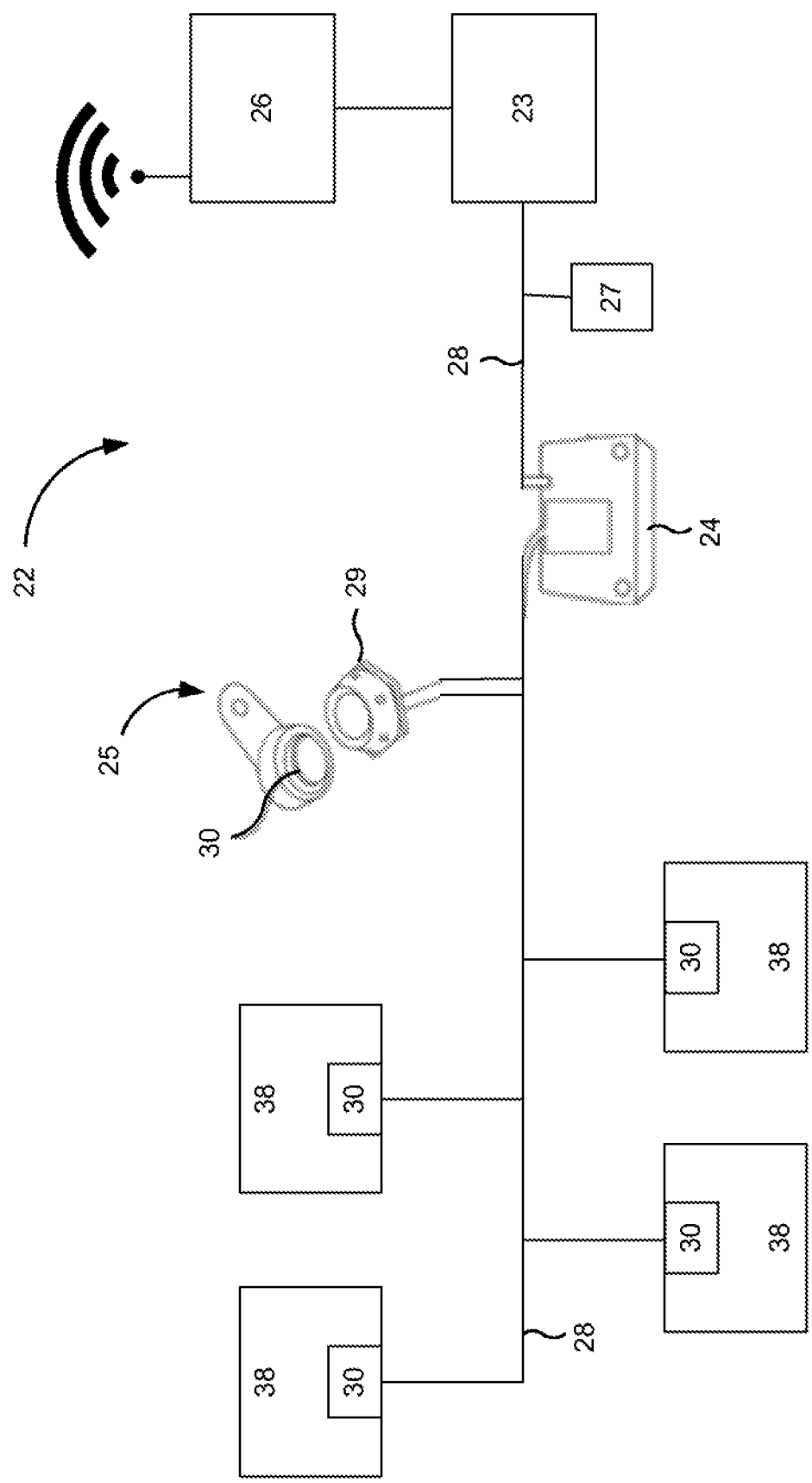
FIG. 2 is a diagram of an example monitoring system for monitoring components of the machine of FIG. 1.

FIG. 2 is a diagram of an example monitoring system 22 for monitoring components of the machine of FIG. 1. Monitoring system 22 may interface with various systems or subsystems (e.g., drive system 12, transmission system 14, articulation system 16, work implement 18 wheels 20, and/or the like) of machine 10 and one or more components within the various systems or subsystems. For example, monitoring system 22 may receive, obtain, and/or monitor information about one or more components of machine 10, such as a filter (e.g., an oil filter, an air filter, and/or the like), a spark plug, a pump, are alternator, and/or any other component of machine 10.

Monitoring system 22 may include a control module 23, a monitoring module 24, a transmitter module 26, and a communication bus 28 (e.g., a one-wire bus, a serial peripheral interface (SPI) bus, a controller area network (CAN) bus, and/or the like). Communication bus 28 may communicably couple control module 23, monitoring module 24, and/or one or more electronic chips 30. Communication bus 28 may be integrated throughout the various systems of machine 10. As will be described in more detail in connection with FIG. 3, an electronic chip 30 may be integrated into one or more components 38 of machine 10. As shown in FIG. 2, when component 38 is installed in machine 10 (e.g., a system or subsystem of machine 10), an electronic chip 30 integrated into the component 38 may be operatively connected to communication bus 28, thereby enabling communication with control module 23. In some implementations, machine 10 may have component-specific mounting bases that are designed to facilitate installation of a component 38 in machine 10 while concurrently connecting the electronic chip 30, integrated within the component 38, to communication bus 28.

Monitoring module 24 may be capable of monitoring one or more components 38, such as by using one or more sensors, by requesting and/or receiving information from one or more components 38, and/or the like. For example, monitoring module 24 may be capable of determining an amount of time that a component 38 has been operating (e.g., on machine 10 since installation, on one or more machines 10, and/or the like), a date and/or time of installation of a component 38, a usage schedule that indicates one or more active time periods during which component 38 is in use and/or one or more inactive time periods during which component 38 is installed but not in use, a condition of a component 38, a condition of machine 10, a condition of a subsystem of machine 10 that includes component 38, and/or the like. In some implementations, monitoring module 24 may include a timer and/or one or more clocks configured to track an amount of time that component 38 has been operating (e.g., by running when component 38 is not in use and maintaining a current time when component 38 is not in use), a usage schedule of component 38, and/or the like.

In some implementations, monitoring module 24 may monitor machine information associated with machine 10 and/or one or more systems, subsystems, or components 38 of machine 10. For example, the machine information may include information that identifies at least one of; the machine 10, a subsystem of the machine 10 that includes the component 38, a machine type of the machine 10, a subsystem type of the subsystem, an age of the machine 10, an age of the subsystem, an amount of time that the machine 10 has been operating, an amount of time that the subsystem has been operating, a location associated with the machine 10, one or more operating conditions that impact a rate of deterioration of component 38, and/or the like. Additionally, or alternatively, monitoring module 24 may monitor similar information for one or more other components 38, such as one or more components 38 that impact operation of a particular component 38.

Monitoring module 24 may include, for example, an electronic control module (ECM) or electronic control unit (ECU) that interfaces with an electronic chip 30. In some implementations, monitoring module 24 includes one or more processors implemented in hardware, firmware, or a combination of hardware and software. The one or more processors may include, for example, a central processing unit (CPU), a microprocessor, a microcontroller, a digital signal processor (DSP), a field-programmable gate array (FPGA), an application-specific integrated circuit (ASIC), or another type of processing component capable of being programmed to perform a function. Additionally, or alternatively, monitoring module 24 may include memory operatively coupled to the one or more processors, such as a random-access memory (RAM), a read only memory (ROM), and/or another type of dynamic or static storage device (e.g., a flash memory, a magnetic memory, and/or an optical memory) that stores information and/or instructions for use by the one or more processors.

Control module 23 may be configured to initiate activity on communication bus 28. Control module 23 may be programmed to use, for example, an enumeration protocol, which is an algorithm that can be used to read a unique identifier of every electronic chip 30 on communication bus 28. In some implementations, control module 23 may include software instructions programmed to control communication and write data to or read data from the one or more electronic chips 30. Control module 23 may include one or more processors implemented in hardware, firmware, or a combination of hardware and software, as described above in connection with the monitoring module 24. Additionally, or alternatively, monitoring module 24 may include memory operatively coupled to the one or more processors, as described above in connection with the monitoring module 24.

In some implementations, control module 23 may function as a master device, which may initiate and control communication with one or more electronic chips 30 functioning as slave devices. An electronic chip 30 may operate over a low voltage range e.g., between about 2.8 V and 5.25 V). Disconnecting an electronic chip 30 from the communication bus 28 may cause the electronic chip 30 to enter a defined reset state. When a connection with communication bus 28 is re-established, the electronic chip 30 may wake up and signal its presence on communication bus 28 to control module 23 and/or monitoring module 24.

Transmitter module 26 may interface with control module 23 and be designed to transmit data to a server 42 (FIG. 4), such as a computer, a mainframe, a server in a central database or data center, a server in a cloud computing environment, or another suitable data storage device or system. For example, transmitter module 26 may be configured to transmit data read from electronic chip 30 by monitoring module 24. Additionally, or alternatively, transmitter module 26 may transmit data from control module 23, monitoring module 24, and/or the like. In some implementations, transmitter module 26 may be integrated into control module 23. In some implementations, transmitter module 26 may include an antenna for wireless communication.

In some implementations, monitoring system 22 may include a service connection port 27, which may be designed to enable a service technician easy access to communication bus 28 for connection of a diagnostic device in order to run diagnostics or conduct other service-related activities for machine 10 and/or monitoring system 22. In some implementations, monitoring system 22 may include a personnel identifier port 29. Personnel identifier port 29 may be designed to connect with an electronic chip 30 assigned to an individual person (e.g., service technician, an operator, and/or the like) in order to identify that individual person when her or she is working with (e.g., servicing, operating, and/or the like) machine 10. In some implementations, the electronic chip 30 may be integrated into a keychain fob 25, which the service technician, operator, and/or the like may carry.

Electronic chip 30 may be integrated into various types of components 38 for machine 10. Component 38 may include, for example, a filter (e, g., a fuel filter, an oil filter, a hydraulic fluid filter, a transmission fluid filter, and/or the like), a sensor, an actuator, a work implement, a pump, a muffler, a turbocharger, a transmission, an engine head, a fuel injector, a spark plug, an alternator, and/or the like. Electronic chip 30 may be integrated, into a component 38 that is disposable or commonly replaced as part of routine maintenance for machine 10. In some implementations, electronic chip 30, control module 23, and/or monitoring module 24 may be capable of detecting installation of component 38 in the machine 10 (e.g., based on detecting presence of electronic chip 30 on communication bus 28, based on establishing a communicative connection between electronic chip 30 and control module 23 and/or monitoring module 24, and/or the like, based on receiving power from the machine 10, based on reading memory 36 (FIG. 3) operatively coupled with the electronic chip 30 to obtain a value indicating that the component 38 has been installed on the machine 10, and/or the like). Based on such detection, monitoring module 24 may request, and/or electronic chip 30 may transmit, a unique identifier 32 to the monitoring module 24 via the communication bus 28. Additionally, or alternatively, based on detecting installation, monitoring module 24 may begin monitoring component 38, and may provide monitoring data to control module 23 via communication bus 28.

In some implementations, monitoring system 22 (e.g., control module 23, monitoring module 24, transmitter module 26, and/or the like) may perform one or more processes described herein. Monitoring system 22 may perform these processes based on a processor executing software instructions stored by a non-transitory computer-readable medium, such as memory. A computer-readable medium is defined herein as a non-transitory memory device. A memory device includes memory space within a single physical storage device or memory space spread across multiple physical storage devices. Software instructions may be read into memory from another computer-readable medium or from another device via a communication interface. When executed, software instructions stored in memory may cause a processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

Figure 5:
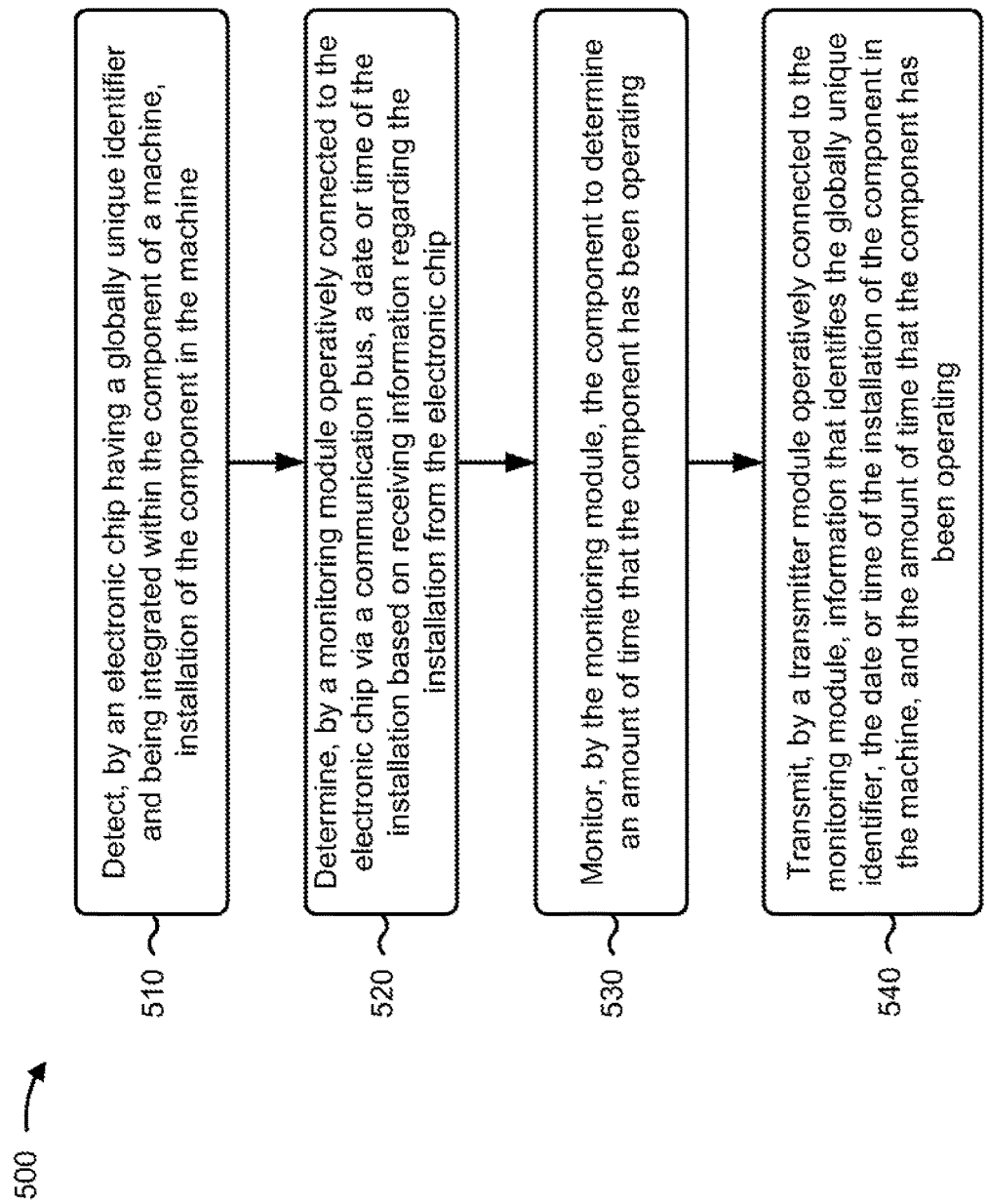
FIG. 5 is a diagram of an example process performed in association with the monitoring system of FIG. 2.

In some implementations, monitoring system 22 may perform one or more processes associated with monitoring usage of one or more components 38 of machine 10, such as process 500 of FIG. 5 and/or one or more other processes described herein.

The number and arrangement of components shown in FIG. 2 are provided as an example. In practice, monitoring system 22 may include additional components, fewer components, different components, or differently arranged components than those shown in FIG. 2. Additionally, or alternatively, a set of components (e.g., one or more components)

of monitoring system 22 may perform one or more functions described as being performed by another set of components of monitoring system 22.

Figure 3:
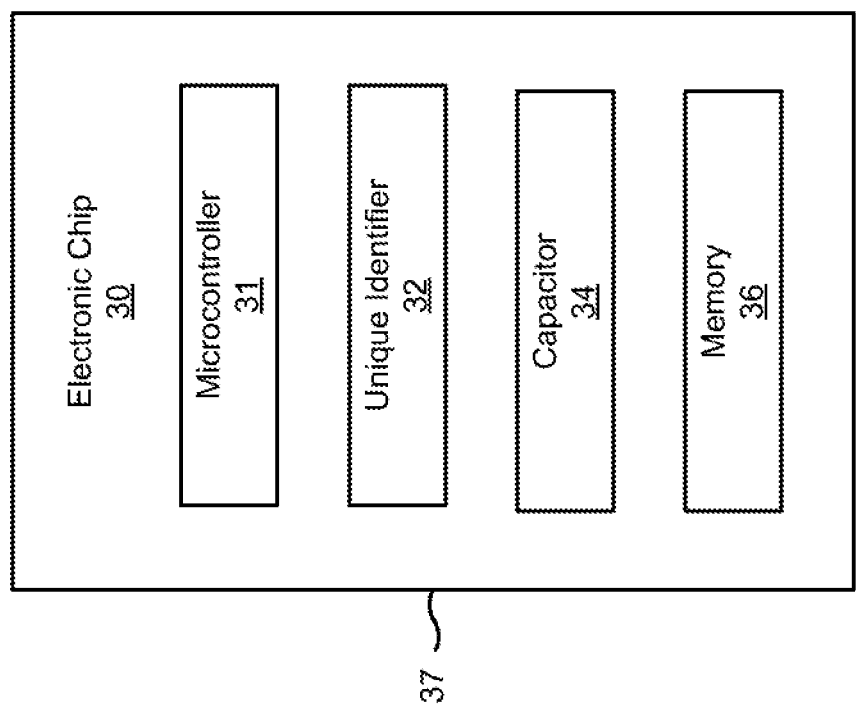
FIG. 3 is a diagram of an example electronic chip of the monitoring system of FIG. 2.

FIG. 3 is a diagram of an example electronic chip 30 of the monitoring system 22 of FIG. 2. Electronic chip 30 may be, for example, a silicon chip or another suitable type of chip. As shown in FIG. 3, electronic chip 30 may include a microcontroller 31 programmed to control the functions performed by electronic chip 30. In some implementations, microcontroller 31 may be, for example, a read only memory (ROM) function control unit. Electronic chip 30 may be assigned a globally unique identifier 32 (e.g., a serial number and/or the like), and may store information that identifies the unique identifier 32 (e.g., in memory 36, a ROM of microcontroller 31, and/or the like). The unique identifier 32 may serve as an address on communication bus 28 when the electronic chip 30 is connected to the communication bus 28. Unique identifier 32 may be a unique, unalterable, factory-programmed identifier, such as a 64-bit number.

In some implementations, electronic chip 30 may include a capacitor 34 and a memory 36. Capacitor 34 may be configured to store a charge and to power electronic chip 30 to enable data to be transmitted from electronic chip 30 via communication bus 28. Memory 36 may be any suitable type of writeable and/or readable type of memory (e.g., flash memory, RAM, ROM, and/or the like). Data may be written to or read from memory 36 by control module 23, monitoring module 24, and/or the like via communication bus 28. In some implementations, data may be written to or read from memory 36 by a service technician connected via service connection port 27. In some implementations, read-only data, such as a unique identifier 32, may be written to memory 36 during initial configuration (e.g., during fabrication, manufacturing, and/or the like), and may not be rewritable. Electronic chip 30 may be enclosed in a protective housing 37.

The number and arrangement of components shown in FIG. 3 are provided as an example. In practice, electronic chip 30 may include additional components, fewer components, different components, or differently arranged components than those shown in FIG. 3. Additionally, or alternatively, a set of components (e.g., one or more components) of electronic chip 30 may perform one or more functions described as being performed by another set of components of electronic chip 30.

Figure 4:
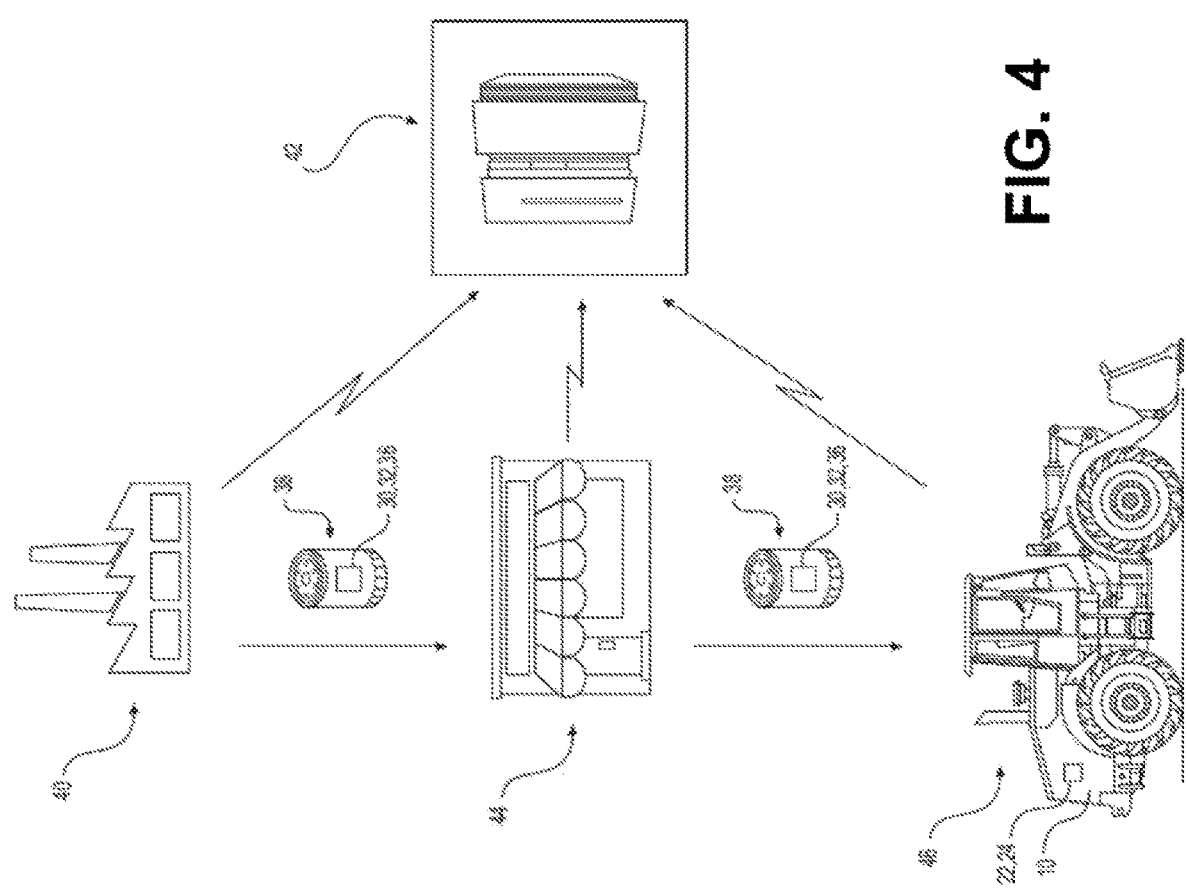
FIG. 4 is a diagram of example data transmitted to a server for performing operations relating to one or more components of the machine of FIG. 1.

FIG. 4 is a diagram of example data transmitted to a server 42 for performing operations relating to one or more components 38 of the machine 10. As shown in FIG. 4, a lifecycle for component 38 may begin at a manufacturer 40 with the manufacturing of component 38. The manufacturing process for component 38 may include assigning unique identifier 32 to component 38 by integrating electronic chip 30 having unique identifier 32 into component 38. Additionally, or alternatively, manufacturing data for component 38 may be associated with the unique identifier 32 and component 38 as part of the manufacturing process. The manufacturing data may include, for example, a part type, a part number, a date of manufacture, a manufacturer name, a location of manufacture, and/or the like. The manufacturing data for component 38 may be associated with the unique identifier 32, for example, by writing the manufacturing data to memory 36 of electronic chip 30 and/or by transmitting the manufacturing data in association with unique identifier 32 to a server 42 (e.g., via a computer, a monitoring module 24 or similar type of device connected to component 38 as part of the manufacturing process, and/or the like).

As shown in FIG. 4, component 38 may travel along a supply chain from manufacturer 40 to a seller 44 (e.g., a dealer, a retailer, a wholesaler, and/or the like). When component 38 is sold by seller 44, sales data for component 38 may be associated with unique identifier 32 of component 38 as part of the sales transaction. The sales data may include, for example, a dealer name, a customer name or end user name, a date of sale, a price of sale, and/or the like. The sales data for component 38 may be associated with unique identifier 32, for example, by writing the sales data to memory 36 of electronic chip 30 and/or by transmitting the sales data along with unique identifier 32 to server 42 (e.g., via a point of sale device, a control module 23 or similar type of device connected to component 38 as part of the sale process, and/or the like).

As shown in FIG. 4, component 38 may travel further along the supply chain from seller 44 to an end user 46. End user 46 may be, for example, a machine owner, operator, or technician that installs component 38 on machine 10, thereby connecting component 38 to monitoring system 22. When component 38 is installed on machine 10, end user data may be associated with unique identifier 32 of electronic chip 30 assigned to component 38 as part of or subsequent to the installation. The end user data may include, for example, a service technician identifier (e.g., for the service technician that installed the component), a date of installation, an end user identifier, a machine identifier for machine 10, and/or the like. The end user data for component 38 may be associated with unique identifier 32, for example, by writing the end user data to memory 36 of electronic chip 30 as part of the installation process and/or by transmitting the manufacturing data along with unique identifier 32 to server 42 (e.g., via monitoring module 24, transmitter module 26, and/or the like).

In some implementations, the end user data may include monitoring information obtained by control module 23 and/or monitoring module 24, such as an amount of time that a component 38 has been operating, a date and/or time of installation of a component 38, a usage schedule that indicates one or more active time periods during which component 38 is in use and/or one or more inactive time periods during which component 38 is installed but not in use, a condition of component 38, a condition of machine 10, a condition of a subsystem of machine 10 that includes component 38, and/or the like.

Additionally, or alternatively, the end user data may include machine information obtained by control module 23 and/or monitoring module 24, such as information that identifies at least one of: the machine 10, a subsystem of the machine 10 that includes the component 38, a machine type of the machine 10, a subsystem type of the subsystem, an age of the machine 10, an age of the subsystem, an amount of time that the machine 10 has been operating, an amount of time that the subsystem has been operating, a location associated with the machine 10, one or more operating conditions that impact a rate of deterioration of component 38, and/or the like. Additionally, or alternatively, end user data may include similar monitoring information and/or machine information for one or more other components 38, such as one or more components 38 that impact operation of a particular component 38.

In some implementations, end user data for component 38 associated with unique identifier 32 may be updated over time. For example, in some implementations, end user data may be routinely updated so that a determination can be made regarding whether component 38 is still connected and in use. In some implementations, end user data may be updated routinely until component 38 is replaced, and the end user data may then be updated with a removal date. In some implementations, operation and/or diagnostic information for machine 10 may be transmitted by monitoring system 22 to server 42 (e.g., via monitoring module 24, transmitter module 26, and/or the like) and associated with unique identifier 32 in memory of the server 42.

Server 42 may include one or more processors implemented in hardware, firmware, or a combination of hardware and software, as described above in connection with the control module 23. Additionally, or alternatively, control module 23 may include memory operatively coupled to the one or more processors, as described above in connection with the control module 23. Additionally, or alternatively, server 42 may include a communication interface that permits server 42 to receive information from another device and/or provide information to another device. Server 42 may perform one or more processes associated with monitoring usage of one or more components 38 of machine 10, such as process 600 of FIG. 6 and/or one or more other processes described herein. Server 42 may perform these processes based on a processor executing software instructions stored by a non-transitory computer-readable medium, such as memory. When executed, software instructions stored in the memory may cause the processor to perform one or more processes described herein.

As indicated above, FIG. 4 is provided as an example. Other examples are possible and may differ from what was described in connection with FIG. 4. For example, additional parties, fewer parties, or different parties may handle component 38 throughout the supply chain from manufacturer 40 to end user 46, such as a shipper, a distributor, an inspector, and/or the like. One or more of these parties may handle component 38 and may associate additional data with unique identifier 32 of component 38 (e.g., shipping data, distribution data, inspection data, and/or the like), such as by writing the data to memory 36 of electronic chip 30 and/or by transmitting the data along with unique identifier 32 to server 42.

FIG. 5 is a diagram illustrating an example process 500 performed, for example, by monitoring system 22. Example process 500 is an example where monitoring system 22 performs operations associated with monitoring usage of a component 38 of a machine 10. In some implementations, process 500 may be performed by another device, system, and/or component described herein.

As shown in FIG. 5, in some aspects, process 500 may include detecting, by an electronic chip having a globally unique identifier and being integrated within the component of the machine, installation of the component in the machine (block 510). For example, monitoring system 22 (e.g., using electronic chip 30, control module 23, monitoring module 24, and/or the like) may detect installation of component 38 in the machine 10. Electronic chip 30 may have a globally unique identifier 32 and may be integrated within the component 38 of the machine 10.

As further shown in FIG. 5, in some aspects, process 500 may include determining, by a monitoring module operatively connected to the electronic chip via a communication bus, a date or time of the installation based on receiving information regarding the installation from the electronic chip (block 520). For example, monitoring system 22 (e.g., using control module 23, monitoring module 24, and/or the like) may determine a date or time of the installation based on receiving information regarding the installation from the electronic chip 30.

As further shown FIG. 5, in some aspects, process 500 may include monitoring, by the monitoring module, the component to determine an amount of time that the component has been operating (block 530). For example, monitoring system 22 (e.g., using control module 23, monitoring module 24, and/or the like) may monitor the component 38 to determine an amount of time that the component 38 has been operating.

As further shown in FIG. 5, in some aspects, process 500 may include transmitting, by a transmitter module operatively connected to the monitoring module, information that identifies the globally unique identifier, the date or time of the installation of the component in the machine, and the amount of time that the component has been operating (block 540). For example, monitoring system 22 (e.g., using transmitter module 26 and/or the like) may transmit (e.g., to server 42 and/or the like) information that identifies the globally unique identifier, the date or time of the installation of the component in the machine, and the amount of time that the component has been operating.

Process 500 may include additional implementations, such as any single implementation or any combination of implementations described below and/or in connection with one or more other processes described elsewhere herein.

In some implementations, the installation is detected based on establishing a communicative connection between the electronic chip and the monitoring module. In some implementations, the installation is detected based on receiving power from the machine and reading memory operatively coupled with the electronic chip to obtain a value indicating that the component has been installed in the machine.

In some implementations, the monitoring module is configured to determine information associated with a condition of the component, the machine, or a subsystem of the machine that includes the component, wherein the condition is determined based on detecting the installation. In some implementations, the transmitter module is configured to transmit, in connection with the globally unique identifier, information that identifies the condition.

In some implementations, the monitoring module is configured to receive, via a wireless communication link, an indication that the component is a used component that was previously operating on the machine or another machine prior to the installation, wherein the indication is determined based on the date or time of the installation of the component in the machine or the amount of time that the component has been operating. In some implementations, the monitoring module is configured to output a notification that the component is a used component.

In some implementations, the monitoring module is configured to determine a one or more active time periods during which the component was in use or one or more inactive time periods when the component was installed but not in use. In some implementations, the transmitter module is configured to transmit, in connection with the globally unique identifier, information that identities the one or more active time periods or the one or more inactive time periods.

In some implementations, the amount of time that the component has been operating includes at least one of an amount of time that the component has been operating since the installation of the component in the machine, or a global amount of time that the component has been operating on one or more machines, independent of the installation in the machine.

In some implementations, the monitoring module is configured to determine a date or time of the installation based on the detection of the installation of the component in the machine. In some implementations, the transmitter module is configured to transmit, in connection with the unique identifier, information that identifies the date or time of the installation. In some implementations, the monitoring module includes a timer configured to track the amount of time that the component has been operating. In some implementations, the timer is configured to run when the component is being cased and is configured to maintain a current time when the component is not being used. In some implementations, the monitoring module includes one or docks configured to track a usage schedule of the component. In some implementations, the usage schedule indicates one or more active time periods during which the component was in use and one or more inactive time periods during which the component was installed but not in use.

In some implementations, the transmitter module is configured to transmit, in connection with the unique identifier and based on information received from the monitoring module, information that identifies at least one of: the machine, a subsystem of the machine that includes the component, a machine type of the machine, a subsystem type of the subsystem, an age of the machine, an age of the subsystem, an amount of time that the machine has been operating, or an amount of time that the subsystem has been operating. In some implementations, the transmitter module is configured to transmit, in connection with the unique identifier, information that identifies a location associated with the machine one or more operating conditions that impact a rate of deterioration of the component.

In some implementations, the control module is configured to receive information associated with one or more components of the machine that impact operation of the component. In some implementations, the transmitter module is configured to transmit, in connection with the unique identifier, the information associated with the one or more components of the machine that impact operation of the component. In some implementations, the transmitter module is configured to transmit, in connection with the unique identifier of the component, at least one of: a unique identifier of a related component of the machine that impacts operation of the component, a date or time of installation of the related component, or an amount of time that the related component has been operating.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
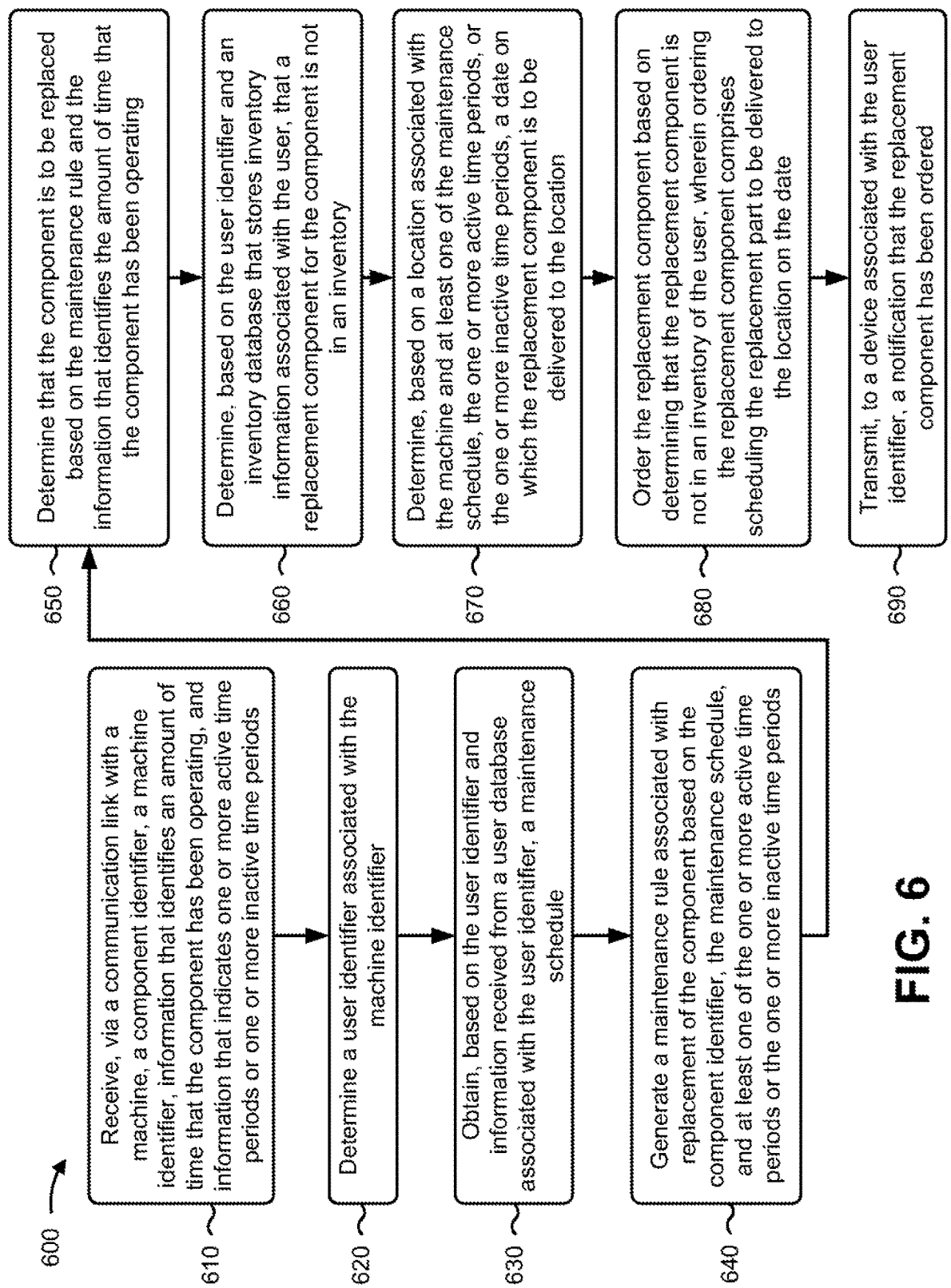
FIG. 6 is a diagram of an example process performed in association with the server of FIG. 4.

FIG. 6 is a diagram illustrating an example process 600 performed, for example, by a server 42, in accordance with various aspects of the present disclosure. Example process 600 is an example where a server 42 performs operations associated with monitoring usage of one or more components 38 of a machine 10. In some implementations, process 600 may be performed by another device, system, and/or component described herein.

As shown in FIG. 6, in some aspects, process 600 may include receiving, via a communication link with a machine, a component identifier that identifies a component of the machine, a machine identifier that identifies the machine, information that identifies an amount of time that the component has been operating, and information that indicates one or more active time periods during which the component was in use or one or more inactive time periods during which the component was not in use (block 610). For example, server 42 may receive such information from machine 10 (e.g., via transmitter module 26). Such information may be obtained by control module 23, monitoring module 24, and/or the like, and transmitted to server 42 via a wireless link.

As further shown in FIG. 6, in some aspects, process 600 may include determining a user identifier associated with the machine identifier, wherein the user identifier identifies a user associated with the machine (block 620). For example, server 42 may use a data structure to look up a user identifier associated with the machine identifier. The user identifier may identify an end user associated with the machine.

As further shown in FIG. 6, in some aspects, process 600 may include obtaining, based on the user identifier and information received from a user database associated with the user identifier, a maintenance schedule that indicates at least one of: a schedule of one or more maintenance staff qualified to service the machine, a coordination rule indicating two or more components that are to be replaced together, or a time period during which the machine is scheduled for maintenance (block 630). For example, server 42 may obtain such information from a user database associated with the user identifier. Such information may be input to the user database via an end user.

As further shown in FIG. 6, in some aspects, process 600 may include generating a maintenance rule associated with replacement of the component based on the component identifier, the maintenance schedule, and at least one of the one or more active time periods or the one or more inactive time periods, wherein the maintenance rule indicates one or more conditions for replacement of the component (block 640). For example, server 42 may generate a maintenance rule that indicate whether the component 38 should be replaced.

As further shown in FIG. 6, in some aspects, process 600 may include determining that the component is to be replaced based on the maintenance rule and the information that identifies the amount of time that the component has been operating, wherein the determination that the component is to be replaced is triggered based on receiving, via the communication link with the machine, the information that identifies the amount of time that the component has been operating (block 650). For example, server 42 may determine whether the component should be replaced based on the maintenance rule.

As further shown in FIG. 6, in some aspects, process 600 may include determining, based on the user identifier and an inventory database that stores inventory information associated with the user, that a replacement component for the component is not in an inventory of the user (block 660). For example, server 42 may determine that a replacement for the component 38 is not in an inventory of the user, such as by looking up information in an inventory database maintained by the user.

As further shown in FIG. 6, in some aspects, process 600 may include determining, based on a location associated with the machine and at least one of the maintenance schedule, the one or more active time periods, or the one or more inactive time periods, a date on which the replacement component is to be delivered to the location (block 670). For example, server 42 may determine a date on which the replacement component is to be delivered to the location of the machine 10.

As further shown in FIG. 6, in some aspects, process 600 may include ordering the replacement component based on determining that the replacement component is not in an inventory of the user, wherein ordering the replacement component comprises scheduling the replacement component to be delivered to the location on the date (block 680). For example, server 42 may order the replacement component such that the replacement component is to be delivered to the location on the date.

As further shown in FIG. 6, in some aspects, process 600 may include transmitting, to a device associated with the user identifier, a notification that the replacement component has been ordered, wherein the notification indicates the date on which the replacement component is to be delivered to the location (block 690). For example, server 42 may transmit, to a device associated with the user identifier, a notification that the replacement component has been ordered. In some implementations, the notification indicates the date on which the replacement component is to be delivered to the location.

Process 600 may include additional implementations, such as any single implementation or any combination of implementations described below and/or in connection with one or more other processes described elsewhere herein.

In some aspects, server 42 may predict a machine usage schedule of the machine based on the one or more active time periods during which the component was in use or the one or more inactive time periods during which the component was not in use. In some implementations, the machine usage schedule indicates one or more future active time periods during which the machine is predicted to be in use or one or more future inactive time periods during which the machine is predicted to not be in use. In some implementations, the determination of the date on which the replacement component is to be delivered is based on the machine usage schedule.

In some implementations, server 42 may receive, via the communication link with the machine, information that identifies a date or time that the component was installed in the machine. In some implementations, the maintenance rule is generated based on the date or time that the component was installed in the machine. In some implementations, server 42 may receive, via the communication link, with the machine, information that identifies one or more operating conditions that impact a rate of deterioration of the component. In some implementations, the maintenance rule is generated based on the one or more operating conditions.

In some implementations, the maintenance rule is generated using a machine learning model trained on data associated with a plurality of components having a same component type as the component, one or more manufacturers associated with the plurality of components, and one or more operating conditions measured in association with the plurality of components.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

Monitoring system 22, as described herein, may be utilized for methods of tracking components 38 of machine 10. These methods may include reading data saved to electronic chips 30 and/or data collected by control module 23 and/or monitoring module 24, and transmitting the data to server 42. This data may include manufacturing data, sales data, end user data, monitoring information, machine information, and/or the like, associated with components 38.

Server 42 may be designed to collect and save lifecycle data for a plurality of components, for a plurality of different machines, from a plurality of manufacturers, dealers, and end users. Server 42 may be maintained by multiple parties or a single party, for example, a manufacturer of the machine, which in some cases may also be the manufacturer of the components. This collection of lifecycle data or a portion of the lifecycle data may be selectively shared with manufactures, dealers, and end users. The collection of lifecycle data may be sorted, grouped, and searched by manufacturers, dealers, and end users in different ways to provide insight and produce potentially valuable information (e.g., marketing, sales, and/or service information). Additionally, or alternatively, server 42 may perform one or more automated actions based on analyzing the lifecycle data and determining whether one or more conditions are satisfied.

In some implementations, the server 42 may automatically order a replacement component based on analyzing data received from the machine 10 for a component 38, based on an end user database, based on end user inventory database, and/or the like. For example, the server 42 may receive, via a communication link with the machine 10, a unique identifier 32 that identifies a component 38 of the machine 10, a machine identifier that identifies the machine 10, information that identities an amount of time that the component 38 has been operating, information that identifies a component usage schedule of the component 38 (e.g., one or more active time periods during which the component 38 was in use or one or more inactive time periods during which the component 38 was not in use). Such information may be received, for example, based on monitoring of the component 38 by monitoring module 24, as described elsewhere herein.

The server 42 may use the machine identifier to determine a user identifier associated with the machine 10. For example, the server 42 may store a data structure that associates machine identifiers with corresponding user identifiers, which may be updated via a communication link with a point of sale device, for example, when a machine 10 is sold to an end user (e.g., by a seller, a dealer, and/or the like). The user identifier may identify an owner of the machine 10 (e.g., a buyer of the machine 10), an operator of the machine 10, and/or the like.

In some implementations, the server 42 may use the user identifier to look up a maintenance schedule, associated with the machine, which may be stored by a user database that is accessible and/or searchable by the server 42. The user database may store, for example, information that associates user identifiers with corresponding maintenance schedules for machines 10 owned by a user identified by the user identifier. The maintenance schedule may indicate, for example, a schedule of one or more maintenance staff employed by the user and qualified to service the machine 10 and/or replace the component 38 (e.g., working hours, non-working hours, hours scheduled for work on one or more machines 10, and/or the like), a coordination rule indicating two or more components of a machine 10 that are to be replaced together (e.g., an air filter and an oil filter), a time period during which the machine is scheduled for maintenance (e.g., for one or more maintenance tasks other than replacing the component 38), and/or the like.

In some implementations, the server 42 may generate a maintenance rule associated with replacement of the component 38 based on the component identifier, the maintenance schedule, and at least one of the one or more active time periods or the one or more inactive time periods. The maintenance rule may indicate one or more conditions for replacing the component 38. For example, the maintenance rule may be generated based on the component identifier, and may indicate an operating life for the component 38. In this case, the maintenance rule may indicate that the component 38 is to be replaced when a number of hours that the component 38 has been operating satisfies a threshold number of hours. Additionally, or alternatively, the maintenance rule may be generated based on the maintenance schedule, such as based on availability of maintenance staff qualified to service the machine 10 and/or replace the component 38, with a condition that the component 38 be replaced when qualified maintenance staff is available. Additionally, or alternatively, the maintenance rule may be generated based on a coordination rule that requires a first component 38 to be replaced when a second, related component 38 is being replaced.

In some implementations, the server 42 may predict a future machine usage schedule of the machine 10 based on a historical component usage schedule received from the machine 10. The machine usage schedule may indicate one or more future active time periods during which the machine 10 is predicted to be in use or one or more future inactive time periods during which the machine 10 is predicted to not be in use. In this case, the maintenance rule may be generated to schedule replacement of the component 38 when the machine 10 is predicted to not be in use.

Additionally, or alternatively, the server 42 may generate the maintenance rule based on information that identifies a date and/or a time that the component 38 was installed on the machine 10, which may be received via a communication link with the machine 10. For example, the maintenance rule may indicate that the component 38 is to be replaced after a threshold amount of time has passed since the component 38 was installed on the machine 10.

Additionally, or alternatively, the server 42 may generate the maintenance rule based on information that identifies one or more operating conditions that impact a rate of determination of the component 38, which may be received via a communication link with the machine 10. The one or more operating conditions may include, for example, a temperature, an oil composition, a level of dust, an air quality, a humidity, an amount of vibration, and/or the like. One or more of the operating conditions may be measured by sensors located in or on the machine 10, and may be received via a communication link with the machine 10 (e.g., via monitoring system 22 and/or the like). Additionally, or alternatively, one or more operating conditions may be determined based on a location of the machine 10. The maintenance rule may indicate, for example, different thresholds of time after which the component 38 is to be replaced for different operating conditions.

In some implementations, the server 42 may apply a machine learning model to one or more factors described above to generate the maintenance rule. For example, the server 42 may train the machine learning model using information from a plurality of components 38 (e.g., which may be associated with different manufacturers, different operating conditions, installations on different machines 10, and/or the like), and may use the trained model to generate a maintenance rule for a component 38 based on components 38 that are of the same type or a similar type as the component 38, that have the same manufacturer as the component 38 (or by adjusting an output maintenance rule for a different manufacturer), that have the same or similar operating conditions as the component 38 (or by adjusting an output maintenance rule based on a difference in operating conditions), and/or the like.

In some implementations, the server 42 may determine that the component 38 is to be replaced based on the maintenance rule and the information that identifies the amount of time that the component has been operating. In some implementations, this determination may be triggered based on receiving, via a communication link with the machine 10, information that identifies an amount of time that the component has been operating. In some implementations, this information may be transmitted and/or received periodically (e.g., once per day, once per week, and/or the like). Additionally, or alternatively, this information may be transmitted and/or received when one or more conditions are satisfied.

In some implementations, the server 42 may use the user identifier to look up inventory information, associated with the user identifier, which may be stored by a user database that is accessible and/or searchable by the server 42. The user database may store, for example, information that associates user identifiers with corresponding inventory information that indicates replacement components 38 owned and/or in an inventory of a user identified by the user identifier.

In some implementations, the server 42 may determine a date on which the replacement component is to be delivered to a location associated with the machine 10, which may be determined based on information received from a communication link with the machine 10 and/or information stored in the user database. In some implementations, the date may be determined based on a date on which the replacement component 38 is to be replaced, which may be determined based on a predicted machine usage schedule of the machine 10. In some implementations, the delivery date may be the same day as the replacement date, a day before the replacement date, two days before the replacement date, three days before the replacement date, and/or the like.

In some implementations, the server 42 may transmit, to a device associated with the user identifier, a notification that the replacement component has been ordered. For example, the server 42 may determine a device identifier for a device associated with a user, such as by looking up the device identifier in the user database using the user identifier. The device identifier may include a phone number of the user, an email address of the user, and/or the like. In some implementations, the notification may indicate the date on which the replacement component is to be delivered.

Additionally, or alternatively, the server 42 may receive information associated with an installed component 38, such as a unique identifier of the component 38, and may determine that the component 38 was previously installed on the same machine 10 and/or a different machine 10. In this case, the server 42 may transmit an indication that the component 38 is a used component. In some implementations, this indication may be transmitted to the monitoring system 22, and may be output by the monitoring system 22 to an output component of the machine 10 (e.g., a display, a speaker, a signal light, and/or the like). Additionally, or alternatively, the indication may be transmitted to a device associated with an end user of the machine, in a similar manner as described above in connection with transmitting a notification to such device.

The detailed description of example implementations of the disclosure herein makes reference to the accompanying drawings and figures, which show the example implementations by way of illustration only. While these example implementations are described in sufficient detail to enable those skilled in the art to practice the disclosure, it should be understood that other implementations may be realized and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation.

What is claimed is:

1. A system for monitoring usage of a component of a machine, comprising:
   an electronic chip having a unique identifier, wherein the electronic chip is integrated within the component of the machine and is configured to detect installation of the component in the machine;
   a monitoring module configured to monitor the component to determine an amount of time that the component has been operating;
   a control module operatively connected to the electronic chip and the monitoring module via a communication bus, wherein the control module is configured to:
      receive, from the electronic chip, the unique identifier of the electronic chip based on the detection of the installation of the component in the machine; and
      receive, from the monitoring module, information that indicates the amount of time that the component has been operating; and
   a transmitter module operatively connected to the control module, wherein the transmitter module is configured to transmit information that identifies the unique identifier and the amount of time that the component has been operating.

2. The system of claim 1, wherein the monitoring module is configured to determine a date or time of the installation based on the detection of the installation of the component in the machine; and
   wherein the transmitter module is configured to transmit, in connection with the unique identifier, information that identifies the date or time of the installation.

3. The system of claim 1, wherein the monitoring module includes a timer configured to track the amount of time that the component has been operating, wherein the timer is configured to run when the component is being used and is configured to maintain a current time when the component is not being used.

4. The system of claim 1, wherein the monitoring module includes one or more clocks configured to track a usage schedule of the component, wherein the usage schedule indicates one or more active time periods during which the component was in use and one or more inactive time periods during which the component was installed but not in use.

5. The system of claim 1, wherein the transmitter module is configured to transmit, in connection with the unique identifier and based on information received from the monitoring module, information that identifies at least one of: the machine, a subsystem of the machine that includes the component, a machine type of the machine, a subsystem type of the subsystem, an age of the machine, an age of the subsystem, an amount of time that the machine has been operating, or an amount of time that the subsystem has been operating.

6. The system of claim 1, wherein the transmitter module is configured to transmit, in connection with the unique identifier, information that identifies a location associated with the machine or one or more operating conditions that impact a rate of deterioration of the component.

7. The system of claim 1, wherein the control module is configured to receive information associated with one or more components of the machine that impact operation of the component; and
   wherein the transmitter module is configured to transmit, in connection with the unique identifier, the information associated with the one or more components of the machine that impact operation of the component.

8. The system of claim 1, wherein the transmitter module is configured to transmit, in connection with the unique identifier of the component, at least one of: a unique identifier of a related component of the machine that impacts operation of the component, a date or time of installation of the related component, or an amount of time that the related component has been operating.

9. A method of monitoring usage of a component of a machine, comprising:
   detecting, by an electronic chip having a globally unique identifier and being integrated within the component of the machine, installation of the component in the machine;
   determining, by a monitoring module operatively connected to the electronic chip via a communication bus, a date or time of the installation based on receiving information regarding the installation from the electronic chip;
   monitoring, by the monitoring module, the component to determine an amount of time that the component has been operating; and
   transmitting, by a transmitter module operatively connected to the monitoring module, information that identifies the globally unique identifier, the date or time of the installation of the component in the machine, and the amount of time that the component has been operating.

10. The method of claim 9, wherein the installation is detected based on establishing a communicative connection between the electronic chip and the monitoring module.

11. The method of claim 9, wherein the installation is detected based on receiving power from the machine and reading memory operatively coupled with the electronic chip to obtain a value indicating that the component has been installed in the machine.

12. The method of claim 9, wherein the monitoring module is configured to determine information associated with a condition of the component, the machine, or a subsystem of the machine that includes the component, wherein the condition is determined based on detecting the installation; and
   wherein the transmitter module is configured to transmit, in connection with the globally unique identifier, information that identifies the condition.

13. The method of claim 9, wherein the monitoring module is further configured to:
   receive, via a wireless communication link, an indication that the component is a used component that was previously operating on the machine or another machine prior to the installation, wherein the indication is determined based on the date or time of the installation of the component in the machine or the amount of time that the component has been operating; and
   output a notification that the component is a used component.

14. The method of claim 9, wherein the monitoring module is configured to determine a one or more active time periods during which the component was in use or one or more inactive time periods when the component was installed but not in use; and
wherein the transmitter module is configured to transmit, in connection with the globally unique identifier, information that identifies the one or more active time periods or the one or more inactive time periods.

15. The method of claim 9, wherein the amount of time that the component has been operating includes at least one of:
an amount of time that the component has been operating since the installation of the component in the machine, or
a global amount of time that the component has been operating on one or more machines, independent of the installation in the machine.

16. A method of monitoring usage of one or more machine components performed by a system, comprising:
receiving, via a communication link with a machine, a component identifier that identifies a component of the machine and a machine identifier that identifies the machine;
receiving, via the communication link with the machine, information that identifies an amount of time that the component has been operating;
receiving, via the communication link with the machine, information that indicates one or more active time periods during which the component was in use or one or more inactive time periods during which the component was not in use;
determining a user identifier associated with the machine identifier, wherein the user identifier identifies a user associated with the machine;
obtaining, based on the user identifier and information received from a user database associated with the user identifier, a maintenance schedule that indicates at least one of: a schedule of one or more maintenance staff qualified to service the machine, a coordination rule indicating two or more components that are to be replaced together, or a time period during which the machine is scheduled for maintenance;
generating a maintenance rule associated with replacement of the component based on the component identifier, the maintenance schedule, and at least one of the one or more active time periods or the one or more inactive time periods, wherein the maintenance rule indicates one or more conditions for replacement of the component;
determining that the component is to be replaced based on the maintenance rule and the information that identifies the amount of time that the component has been operating, wherein the determination that the component is to be replaced is triggered based on receiving, via the communication link with the machine, the information that identifies the amount of time that the component has been operating;
determining, based on the user identifier and an inventory database that stores inventory information associated with the user, that a replacement component for the component is not in an inventory of the user;
determining, based on a location associated with the machine and at least one of the maintenance schedule, the one or more active time periods, or the one or more inactive time periods, a date on which the replacement component is to be delivered to the location;
ordering the replacement component based on determining that the replacement component is not in an inventory of the user, wherein ordering the replacement component comprises scheduling the replacement component to be delivered to the location on the date; and
transmitting, to a device associated with the user identifier, a notification that the replacement component has been ordered, wherein the notification indicates the date on which the replacement component is to be delivered to the location.

17. The method of claim 16, further comprising:
predicting a machine usage schedule of the machine based on the one or more active time periods during which the component was in use or the one or more inactive time periods during which the component was not in use, wherein the machine usage schedule indicates one or more future active time periods during which the machine is predicted to be in use or one or more future inactive time periods during which the machine is predicted to not be in use; and
wherein the determination of the date on which the replacement component is to be delivered is based on the machine usage schedule.

18. The method of claim 16, further comprising:
receiving, via the communication link with the machine, information that identifies a date or time that the component was installed in the machine; and
wherein the maintenance rule is generated based on the date or time that the component was installed in the machine.

19. The method of claim 16, further comprising:
receiving, via the communication link with the machine, information that identifies one or more operating conditions that impact a rate of deterioration of the component; and
wherein the maintenance rule is generated based on the one or more operating conditions.

20. The method of claim 16, wherein the maintenance rule is generated using a machine learning model trained on data associated with a plurality of components having a same component type as the component, one or more manufacturers associated with the plurality of components, and one or more operating conditions measured in association with the plurality of components.

* * * * *